United States Patent
Beaty et al.

(10) Patent No.: US 8,041,663 B2
(45) Date of Patent: Oct. 18, 2011

(54) METHOD FOR PREDICTING PROBLEMATIC CONFIGURATIONS AND RECOMMENDING SAFE CONFIGURATIONS

(75) Inventors: Kirk A. Beaty, Goldens Bridge, NY (US); Andrzej Kochut, Elmsford, NY (US); Ruchi Mahindru, Yonkers, NY (US); Anca Sailer, Scarsdale, NY (US)

(73) Assignee: International Business Machines Corporation, Armonk, NY (US)

( * ) Notice: Subject to any disclaimer, the term of this patent is extended or adjusted under 35 U.S.C. 154(b) by 904 days.

(21) Appl. No.: 12/038,684

(22) Filed: Feb. 27, 2008

(65) Prior Publication Data

US 2009/0216697 A1 Aug. 27, 2009

(51) Int. Cl.
*G06F 17/00* (2006.01)
*G06N 5/00* (2006.01)

(52) U.S. Cl. ................ 706/45; 705/5; 709/224
(58) Field of Classification Search ........... 706/45
See application file for complete search history.

(56) References Cited

U.S. PATENT DOCUMENTS

| | | | |
|---|---|---|---|
| 5,729,472 A | 3/1998 | Seiffert | |
| 6,484,128 B1 | 11/2002 | Sekiya | |
| 6,578,151 B1 * | 6/2003 | Nilsen | 726/11 |
| 6,643,614 B2 | 11/2003 | Ding | |
| 6,678,639 B2 | 1/2004 | Little | |
| 6,829,734 B1 * | 12/2004 | Kreulen et al. | 714/46 |
| 6,944,759 B1 | 9/2005 | Crisan | |
| 7,127,506 B1 | 10/2006 | Schmidt | |
| 7,191,329 B2 | 3/2007 | Murphy | |
| 2002/0023154 A1 | 2/2002 | Singh | |
| 2002/0052718 A1 | 5/2002 | Little | |
| 2004/0177244 A1 | 9/2004 | Murphy | |
| 2004/0177245 A1 | 9/2004 | Murphy | |
| 2006/0025962 A1 | 2/2006 | Ma | |
| 2006/0168016 A1 | 7/2006 | Barrett | |

OTHER PUBLICATIONS

Huang, Y., Ribak, A., Shiloach, Y., and Winokur, A., "Knowledge Base Structure for Fault Management," TDB v37 n7 07-94 p. 521-526, Austin, Texas, USA.

* cited by examiner

*Primary Examiner* — Omar Fernandez Rivas
*Assistant Examiner* — Kalpana Bharadwaj
(74) *Attorney, Agent, or Firm* — Michael J. Buchenhorner; Anne Dougherty

(57) ABSTRACT

A system and method for method for assessing configurations includes steps or acts of: receiving configuration data related to configuration items and problem data related to problem tickets; classifying the configuration data into configuration classes; computing a class probability of the configuration classes; associating each configuration class with the problem tickets related to said configuration class; computing a ticket probability distribution of the problem tickets based on number of incidents; evaluating problem ticket characteristics per configuration class to determine a coefficient of trouble value for each configuration class; ranking the configuration classes according to their coefficient of trouble; wherein a highest ranking has the least coefficient of trouble; determining potentially optimal configurations based on the rankings; and providing to a user migration paths corresponding to the potentially optimal configurations.

20 Claims, 5 Drawing Sheets

First Level – Configuration class

Hardware inventory items
Operating System
Middleware
Software Applications

410

Second Level – Installation class

OS & Hardware Combinations
Middleware & OS Combinations
Applications & Middleware

420

Third Level – Stack class

Middleware, OS & Hardware Combinations
Applications, Middleware, Hardware & OS Combinations

430

Fourth Level – Run-Time class

HTTP Server, Application Server & Database Combinations

METHOD FOR PREDICTING PROBLEMATIC CONFIGURATIONS AND RECOMMENDING SAFE CONFIGURATIONS

CROSS-REFERENCE TO RELATED APPLICATIONS

None.

STATEMENT REGARDING FEDERALLY SPONSORED-RESEARCH OR DEVELOPMENT

None.

INCORPORATION BY REFERENCE OF MATERIAL SUBMITTED ON A COMPACT DISC

None.

FIELD OF THE INVENTION

The invention disclosed broadly relates to the field of problem management and more particularly relates to the field of predicting problematic configurations.

BACKGROUND OF THE INVENTION

Systems that facilitate remote technical assistance are an integral part of the overall IT (information technology) products' sales, deployment, and maintenance life cycle. They are used by technical employees, business partners, and vendors to help solve hardware and software problems encountered by customers.

Typically, the technical helpdesk personnel receive an email or a call from the customer, describing the issue that needs to be fixed. They record the initial and subsequent email exchanges on that issue, as well as any other information that they consider relevant for describing or solving the problem by using specific problem management tools. This is known by various names: "problem ticket," "trouble ticket," and "bug report."

Another source of problem tickets relates to tickets automatically generated by IT problem management tools when specific rules or conditions hold true in the managed IT environment. All of these tools help keep track of individual tickets by assigning each problem a specific identification code, as well as details such as the customer identification and IT system configuration context. Some configurations are inherently malfunctioning and hence generate more problem tickets than others. Although the problem ticket collection is rich in technical information reflecting the health history of a customer's environment, it is of little relevance with respect to configuration compliance when it comes to migrating IT systems and applications on those systems to new releases.

Therefore, there is a need for a system to overcome the above-stated shortcomings of the known art.

SUMMARY OF THE INVENTION

Briefly, according to an embodiment of the invention a method for assessing configurations includes steps or acts of receiving configuration data related to configuration items and problem data related to problem tickets; classifying the configuration data into configuration classes; computing a class probability of the configuration classes; associating each configuration class with the problem tickets related to said configuration class; computing a ticket probability distribution of the problem tickets based on number of incidents; evaluating problem ticket characteristics per configuration class to determine a coefficient of trouble value for each configuration class; ranking the configuration classes according to their coefficient of trouble; wherein a highest ranking has the least coefficient of trouble; determining potentially optimal configurations based on the rankings; and providing to a user migration paths corresponding to the potentially optimal configurations.

The method can also be implemented as machine executable instructions executed by a programmable information processing system or as hard coded logic in a specialized computing apparatus such as an application-specific integrated circuit (ASIC).

BRIEF DESCRIPTION OF THE DRAWINGS

To describe the foregoing and other exemplary purposes, aspects, and advantages, we use the following detailed description of an exemplary embodiment of the invention with reference to the drawings, in which:

FIG. 4 shows a list of four levels of configuration classes, according to an embodiment of the present invention.

Figure 1:
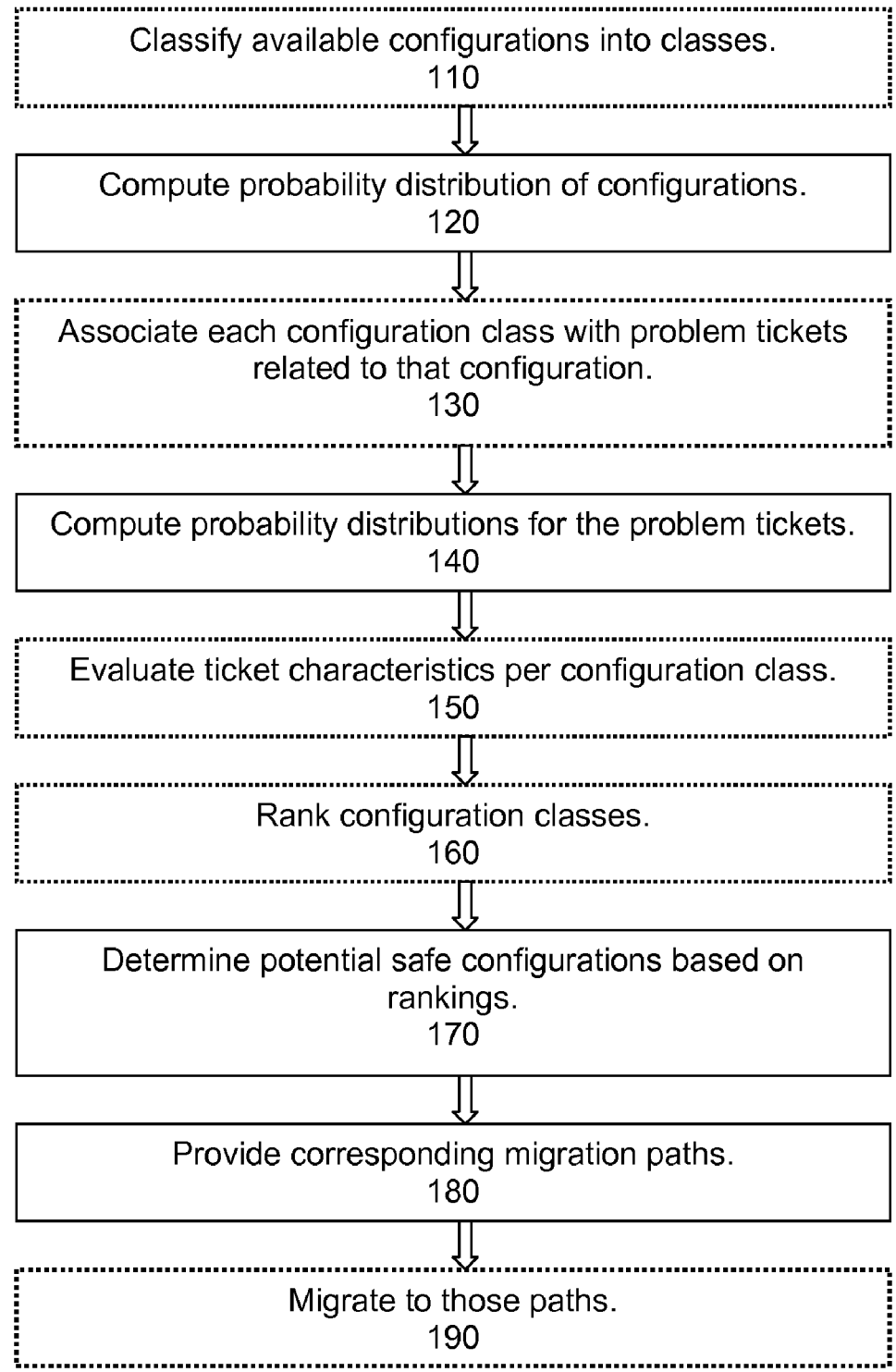
FIG. 1 is a flowchart of a method according to an embodiment of the invention.

While the invention as claimed can be modified into alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the scope of the present invention.

DETAILED DESCRIPTION

We describe a method to build a knowledge base of classified configurations and enable enhanced problem and release management systems to predict potentially harmful configurations. For purposes of this discussion, a harmful configuration is any configuration that has more technical issues than other configurations. The technique is based on identifying configuration patterns that have generated a large number of problems compared to patterns that have not been the source of trouble. The service method can be used to (1) point out current problematic or unusual customer configurations compared to a deployment base and suggest known safe configurations to which to migrate, as well as to (2) guide the future deployments by recommending the top safe configurations.

As a particular embodiment of the invention, we have considered information technology (IT) configurations, as they are stored in inventory databases, and IT problem tickets, as they are used by remote technical personnel in IT Operations. By aggregating configuration and problem ticketing data from a large number of customers, a knowledge base of assessed configurations can be built to share the potential impact on the overall system when modifying a part of the production environment configuration.

The objective of the present invention is to provide a method to help identify configurations that could potentially disrupt the normal operation of a customer environment and to separate them from the configurations that are mostly expected to keep the customer environment safe.

Referring now in specific detail to the drawings, and particularly to FIG. 1, there is illustrated a flow chart illustrating a processing method 100 according to an embodiment of the invention. The dashed boxes indicate processes that may be performed off-line. We make an assumption that the process inputs are available. The process inputs are: 1) configuration data at a level of granularity such that one configuration is easily distinguishable from another; 2) trouble ticket data that identifies the configuration for which the trouble was reported; and 3) customer data that identifies the configuration used for that client and the trouble tickets reported by that client. A trouble ticket 225 is shown as input into a database 206.

Beginning in step 110, we classify the configurations available from the customers' inventory, configuration records, or any other environment related records, into classes. These classes are based, for example, on the type, model, and version of the components, on the relationship between them as a result of the way they are installed in the systems, and on their dependencies at run-time. These categories are selected by way of example only. The class categories should be selected according to the needs of the customers and the system configuration. New categories of classification can and should be added according to configuration changes and customer input.

This process may be performed off-line in circumstances where technical personnel need immediate access to the relevant data. The classification and related analysis may involve data federations and human decisions that can take longer than initially expected from an automatic simple database query. In a completely automated embodiment, the data is retrieved from a data store (such as databases 202 and 206), classified, and then the classified data is supplied as input into the next step without user intervention.

In step 120 we compute the configurations' probability distribution PDISTRIB among equivalent configurations. PDISTRIB relates to the distribution of a particular configuration out at the customers' sites. We compute for each configuration its share of distribution out of the customers' installed base, i.e., based on the configurations' incidence. The computation for a configuration X is as follows:

$$PDISTRIB = \text{the number of installations of the configuration } X/\text{number of total installations of configurations of the same class.}$$

Next, in step 130 we associate each configuration class from step 110 with the problem tickets 225 related to that configuration. Then, in step 140 we compute the problems' probability distribution PTROUBLE among equivalent problems based on the problems' number of incidents. PTROUBLE relates to the number of problem tickets generated by a particular configuration. This process may also be performed off-line or as part of an automaton.

After we have computed the probability distributions, we move on to step 150 where we also evaluate a problem ticket's 225 relevant characteristics, such as, but not limited to, high and low ticket severity distribution PH_SEVERITY and PL_SEVERITY, high and low Mean Time to Repair (MTTR) distribution PH_MTTR and PL_MTTR, and duration of operation, per configuration class.

Next, in step 160, we rank the configuration classes based on the trouble coefficient evaluation. A high ranking associated with a configuration class indicates that that configuration class is less likely to generate trouble tickets. The trouble coefficient can be derived from the probability distributions computed above in steps 120 and 140.

Step 170 is for determining potentially safe configurations to which to migrate, for those configurations that were accorded a high ranking. In step 180 we provide the corresponding migration paths to those optimal configurations. Once the configuration classes and their ranking and migration paths have been identified using the method presented in this invention, in step 190 a system administrator using this service can in full awareness decide to deploy or migrate to a specific configuration in the customers' environment.

The steps presented above can be repeated periodically, or when significant new data is available in the customers' repositories. The main advantages of using our solution over the related work cited earlier are: (a) generality with respect to the configuration scope, including in case of IT configurations hardware, operating system, software, network, and any other potential IT configuration type as available in the customer repositories; (b) elaborate methodology to generate the knowledge repository of rated configurations and migration paths; and (c) integration into service for problem and release management support.

Additionally, clustering the ticketing data around the different configurations classes by the association process done in step 130 above, allows for targeted problem ticket search. That is, rather than searching the entire problem ticket space for an existent problem record, our configuration-based problem ticket clustering allows for search within the reduced scope of the relevant configurations.

Figure 2:
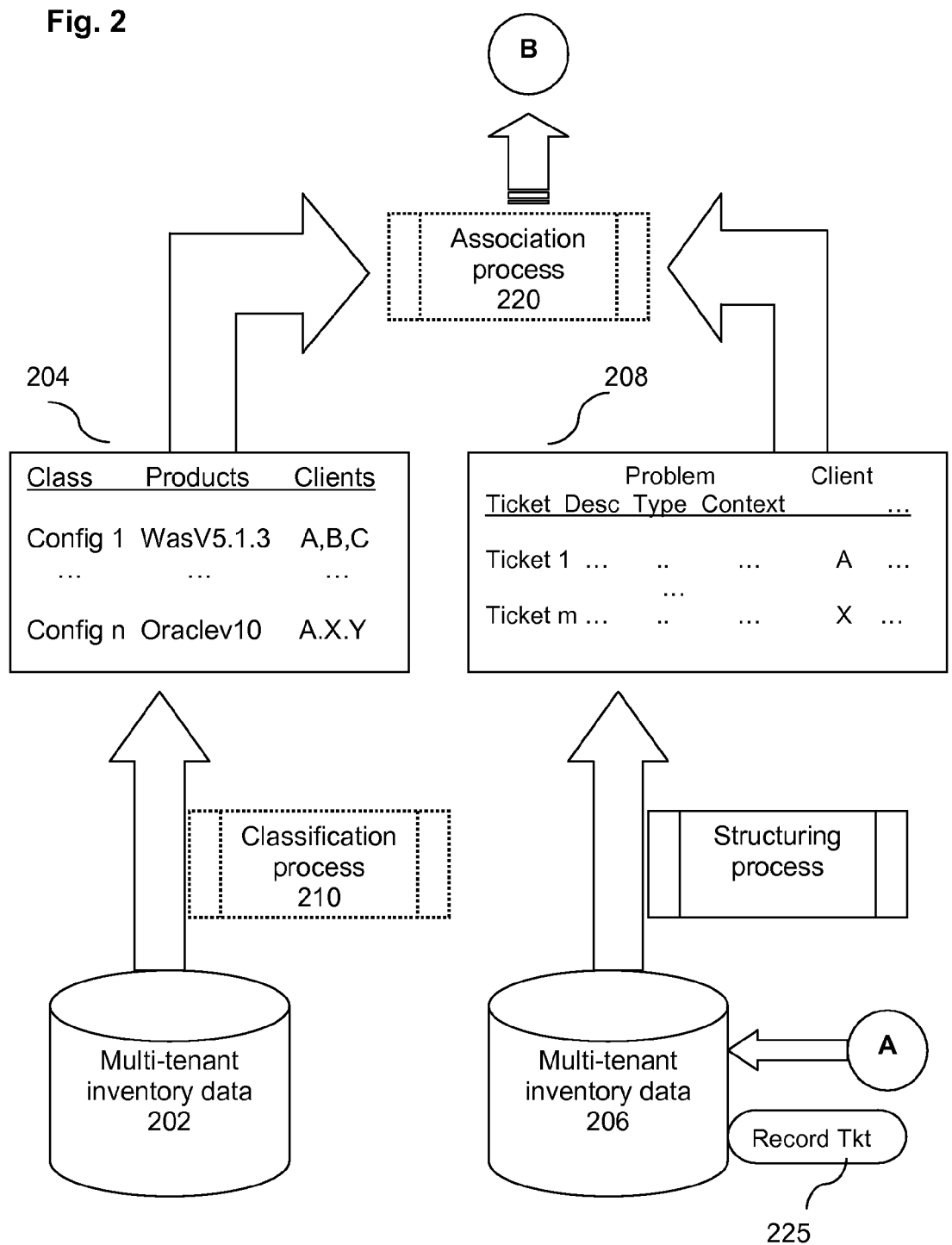
FIG. 2 is a data flow diagram indicating the on-line and off-line processes and data as part of the system according to an embodiment of the present invention.

A specific embodiment of a problematic configuration prediction system based on our invention is shown in FIG. 2. Each item and the information processing involved during the operational phase of the system are described below:

Item 202 is a database, a federation of databases, a collection of files, or a file that stores inventory data from one or more customers. The inventory data taken into consideration here encompasses any information related to the customers' environment configuration. In the specific case of IT environments, this may include for instance the customers' hardware name, type, model, version, serial number, and components, the operating system name and level, the software name, type, version, components, the relationship between the above as a result of the way they are installed on the systems, their dependencies at run-time, and any other pertinent details.

Process 210, the Classification Process, represents the procedure for organizing configurations into classes. There are multiple potential algorithms for classifying configurations of complex environments. FIG. 4, described below, shows one possible method of classification.

Once the classes are generated, we compute the classes' probability distribution PDISTRIB among equivalent items. For instance, we compute the hardware classes' probability distribution PDISTRIB among the known customers' hardware configurations based on the configurations' incidence out of the total configurations of the customers' installed base. Likewise, the OS&hardware classes' probability distribution PDISTRIB is computed among the known customers' OS&hardware configurations based on their configurations' incidence out of the total configurations of the customers' installed base.

Item 204 is an example of a configuration classification representation as a table in a relational database. Item 206 represents a database, a federation of databases, a collection of files, or a file that stores the original problem ticketing data. This is the repository where the helpdesk personnel and the remote technical assistance people record the actions taken during their investigation of the customers' issues, including specifications of the related configuration. Item 208 is an example of a structured problem ticket 225 representation as a table in a relational data base.

U.S. patent application Ser. No. 11/675,392, filed on Feb. 15, 2007, "Method and Apparatus for Automatically Structuring Free Form Heterogeneous Data" by Xing Wei et al. is an example of a structuring process transforming unstructured problem ticketing data as available in Item 206 into a structured format as represented by Item 208.

Process 220, the process of Association, represents the procedure through which the configuration classes are associated with problem tickets 225. Examples of relationships between configuration classes and problem tickets 225 that make possible the associations are customer identification and product serial number. As part of this process, we compute the probability distribution PTROUBLE of generating problem tickets among equivalent problems based on the problems' incidence. We also evaluate the problem tickets' relevant characteristics, such as, but not limited to, high and low ticket severity distribution PH_SEVERITY and PL_SEVERITY; high and low Mean Time to Repair (MTTR) distribution PH_MTTR and PL_MTTR; duration of operation; and total MTTR; per configuration class.

Figure 3:
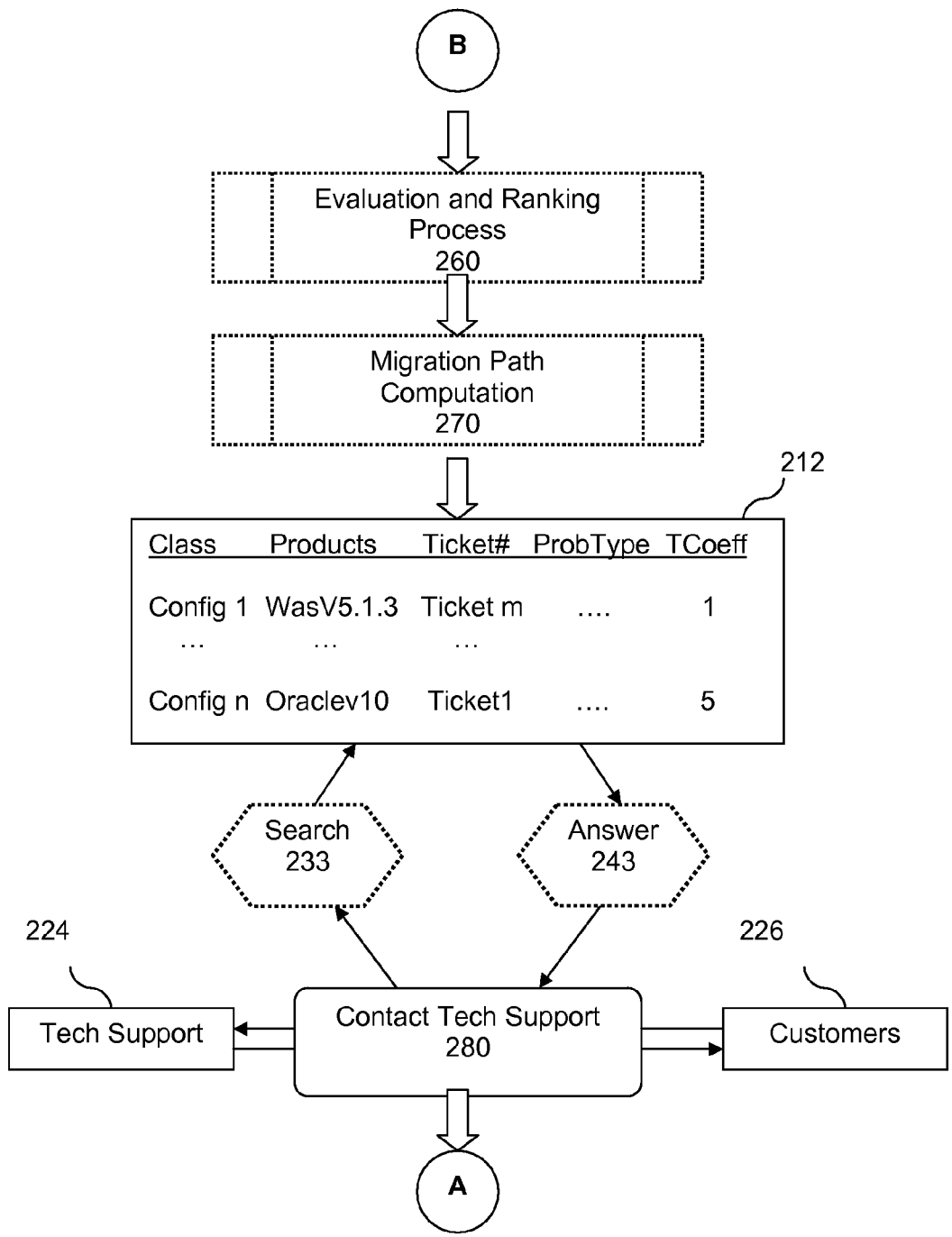
FIG. 3 is a continuation of the data flow diagram of FIG. 2, according to an embodiment of the present invention.

Referring now to FIG. 3, Process 260, the process of Risk Evaluation and Ranking, is the procedure of ordering the configuration classes based on the trouble coefficient (TC) evaluation. The trouble coefficient is a function of the probability distributions computed in Process 220. As an example, TC could be computed as follows:

$$TC(class_i) = \frac{P_{TROUBLE}}{P_{DISTRIB}} * \frac{P_{H\_SEVERITY}}{P_{L\_SEVERITY}} * \frac{P_{H\_MTTR}}{P_{L\_MTTR}} * \frac{T_{MTTR}}{T_{Operation}}$$

Process 280 is the Migration Path Computation that evaluates, based on expert rules, potentially safe configurations to which to migrate a problematic configuration, with optimized change costs. Item 212 is an example of a configuration classification ranking representation as a table in a relational database. Once the inventory and problem ticket data knowledge is pre-processed as detailed in the process, the inferred structure now allows the aggregated data to be used in many applications, such as applications associated with providing remote technical support for IT products, such as hardware configuration, software configuration, network configuration, and any combinations of the above.

For instance, FIGS. 2 and 3 illustrate how it can be used by remote technical personnel 224 when a problem is reported by a customer 226, to quickly look up the table in Item 212 (Search 233) to find out if the customer's configuration has been a source of similar problems for other users (Answer 243). Another pertinent use is in applications associated with release management, such as release planning with known safe configurations.

The structured knowledge can also be used to discover the most unsafe configurations, as well as the most frequent problems in a given configuration. Such insights can be leveraged in the development of an automatic problem determination system for a specific configuration. The process may be initiated on a scheduled basis, or in the alternative, the process could be generated upon receipt of a trigger. The triggers could be a configuration change, a new version release, or a even a call to technical support 280 to report a problem.

Referring to FIG. 4, the first level 410 of our classification is obtained by grouping equivalent independent items into classes. As an example, the hardware inventory items are grouped by hardware name, type, model, version, serial number, components, and so on in hardware classes. Similarly we group the operating system, middleware, and software applications by their respective name, type, model, version, serial number, components into operating system, middleware, and software application classes, respectively.

For the second level of classification 420, we use the relationship between the configuration items as dictated by the way they are installed in the systems. For instance, in the particular case of the IT configurations, a software application is installed on top of middleware or directly on an operating system which is installed on a given hardware. Thus, we take into account combinations of two directly dependent items, for instance we consider the operating system (OS) and hardware combinations and generate OS&hardware configuration classes. Likewise, we classify the middleware and OS combinations into middleware&OS configuration classes, and application and middleware combinations into application&middleware configuration classes.

The third level of our classification 430 is obtained by considering the whole stack of installation dependencies. Thus, we group middleware, operating system (OS), and hardware combinations into middleware&OS&hardware configuration classes, and application, middleware, OS, and hardware combinations into application&middleware&OS&hardware configuration classes.

For the fourth level of classification 440, we consider the run-time dependency information. In the specific embodiment of our invention for IT environments, an example of a system with run-time dependencies is the typical three-tier eBusiness system comprising an HTTP server depending on an Application Server depending on a Database. In this case, we group the HTTP server, Application Server, and Database combinations into classes based on the available configuration data about their name, type, model, version, and so forth.

Figure 5:
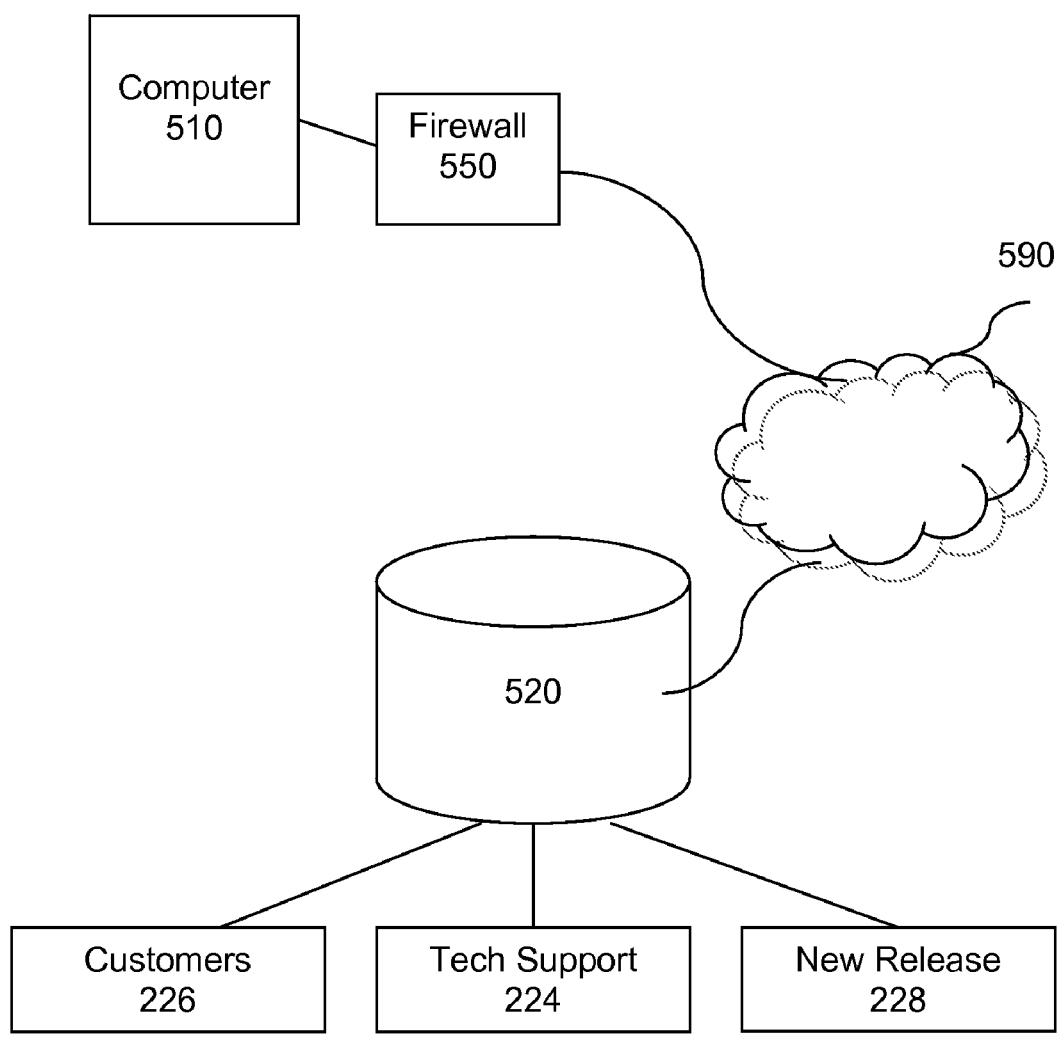
FIG. 5 is a simplified depiction of an information handling system according to an embodiment of the present invention.

The invention can be implemented as a computer program, for example written in the Java or C programming language. Referring to FIG. 5, there is shown a simplified block diagram of an information handling system 500 configured to operate according to one embodiment of the present invention. For purposes of this invention, information handling system 500 includes at least one computer 510. Computer 510 represents any type of computer, information processing system or other programmable electronic device, including a client computer, a server computer, a portable computer, an embedded controller, a personal digital assistant, and so on. The computer 510 may be a stand-alone device or networked into a larger system. The computer 510 preferably includes a network interface and could include a number of operators and peripheral devices common to computers and known in the art.

Data store 520 represents one or more data stores such as a database, file system, inventory system, and other such items. Preferably, the data store 520 is operatively connected with the computer 510. A firewall 550 or a proxy server may be needed when transmitting data over a network or via the Internet 590. The data store 520 receives data from tech support 224, customers 226, and IT Management especially when it issues a new product release 228.

The invention can be provided as a service to in-house staff or outside customers. Customers may transmit their trouble tickets and configuration data and request an analysis on a regular basis, or perhaps only when confronting a problem of a certain severity. The customers may be billed on a subscription basis, or per analysis. In a turn-key operation, the service may include actually changing a customer's migration paths to follow the new optimal migration paths discovered by the analysis method.

Therefore, while there has been described what is presently considered to be the preferred embodiment, it will understood by those skilled in the art that other modifications can be made within the spirit of the invention. The above description of an embodiment is not intended to be exhaustive or limiting in scope. The embodiment, as described, was chosen in order to explain the principles of the invention, show its practical application, and enable those with ordinary skill in the art to understand how to make and use the invention. It should be understood that the invention is not limited to the embodiment described above, but rather should be interpreted within the full meaning and scope of the appended claims.

We claim:

1. A method for assessing configurations, comprising steps of:
   receiving configuration data related to configuration items; problem data related to problem tickets; and customer data cross-referenced with the configuration data and problem data;
   classifying the configuration data into configuration classes;
   computing a class probability distribution of the configuration classes;
   associating each of the configuration classes with the problem tickets related to those configuration classes;
   computing a ticket probability distribution of the problem tickets based on number of incidents;
   evaluating problem ticket characteristics per configuration class to determine a coefficient of trouble value for each configuration class;
   ranking the configuration classes according to their coefficient of trouble, wherein a highest ranking has the least coefficient of trouble;
   determining potentially optimal configurations based on the rankings; and
   providing to a user migration paths corresponding to the potentially optimal configurations.

2. The method of claim 1 wherein the steps are repeated when significant new data is available.

3. The method of claim 1 wherein the steps are repeated periodically on a scheduled basis.

4. The method of claim 1 wherein classifying the configuration data further comprises:
   grouping equivalent configuration items into the configuration classes according to their relationship;
   grouping the configuration classes into installation classes according to their installation dependencies;
   grouping the installation classes into stack classes according to their installation stack dependencies; and
   grouping the stack classes into run-time classes according to their run-time dependencies.

5. The method of claim 4 wherein computing the class probability distribution further comprises:
   computing the probability distribution for each of the configuration, installation, stack, and run-time classes, wherein the probability distribution measures the occurrence of said class out of the total number of configurations of a customer's installed base.

6. The method of claim 1 wherein evaluating problem ticket characteristics per configuration class comprises calculating:
   high and low ticket severity distribution;
   high and low mean time to repair distribution;
   duration of operation; and
   total mean time to repair.

7. The method of claim 6 wherein determining the coefficient of trouble value for each class comprises:
   for each class,
      dividing the ticket probability distribution by the class probability distribution;
      dividing the high ticket severity distribution by the low ticket severity distribution;
      dividing the high mean time to repair distribution by the low mean time to repair distribution;
      dividing the total mean time to repair by the duration of operation; and
      multiplying the quotients of each division.

8. The method of claim 1 wherein the classifying, evaluating, and ranking steps can be performed off-line.

9. An information handling system for assessing configurations, comprising:
   at least one computer system configured to:
      receive configuration data related to configuration items; problem data related to problem tickets; and customer data cross-referenced with the configuration data and problem data;
      classify the configuration data into configuration classes;
      compute a class probability distribution for each of the configuration classes;
      associate each configuration class with the problem tickets related to said configuration class;
      compute a ticket probability distribution of the problem tickets based on number of incidents;
      evaluate problem ticket characteristics per configuration class to determine a coefficient of trouble value for each configuration class;
      rank the configuration classes according to their coefficient of trouble, wherein a highest ranking has the least coefficient of trouble;
      determine potentially optimal configurations based on the rankings; and
      provide to a user migration paths corresponding to the potentially optimal configurations; and
   at least one data store, comprising the configuration data, customer data, and problem data:
   a network interface for a point of interconnection between the at least one computer system and the data store.

10. The information handling system of claim 9 further comprising a firewall operatively connected to the at least one computer system.

11. The information handling system of claim 9 further comprising a proxy server operatively connected to the at least one computer system.

12. A computer program product embodied on a computer readable storage medium, the computer program product comprising program code that, when executed, causes a computer to:
   receive configuration data related to configuration items; problem data related to problem tickets; and customer data cross-referenced with the configuration data and problem data;

classify the configuration data into configuration classes;

compute a class probability distribution of the configuration classes;

associate each configuration class with the problem tickets related to said configuration class;

compute a ticket probability distribution of the problem tickets based on number of incidents;

evaluate problem ticket characteristics per configuration class to determine a coefficient of trouble value for each configuration class;

rank the configuration classes according to their coefficient of trouble, wherein a highest ranking has the least coefficient of trouble; and determine potentially optimal configurations based on the rankings.

13. The computer program product of claim 12 wherein the program code further causes a computer to: provide to a user a recommendation of migration paths corresponding to the potentially optimal configurations, such that the recommended migration paths make more use of the potentially optimal configurations, while avoiding less optimal configurations.

14. The computer program product of claim 12 wherein computing the class probability distribution further comprises:

computing the probability distribution for each of the configuration, installation, stack, and run-time classes, wherein the probability distribution measures the occurrence of said class out of the total number of configurations of a customer's installed base.

15. The computer program product of claim 12 wherein evaluating problem ticket characteristics per configuration class comprises calculating:

high and low ticket severity distribution;
high and low mean time to repair distribution;
duration of operation; and
total mean time to repair.

16. The computer program product of claim 12 wherein determining the coefficient of trouble value for each class comprises:

for each class,
dividing the ticket probability distribution by the class probability distribution;
dividing the high ticket severity distribution by the low ticket severity distribution;
dividing the high mean time to repair distribution by the low mean time to repair distribution;
dividing the total mean time to repair by the duration of operation; and
multiplying the quotients of each division.

17. A system for obtaining services comprising:

at least one computer system configured to:
receive configuration data related to a customer's configuration items; problem data related to problem tickets; and customer data cross-referenced with the configuration data and problem data;

classify the configuration data into configuration classes;

compute a class probability distribution of the configuration classes;

associate each configuration class with the problem tickets related to said configuration class;

compute a ticket probability distribution of the problem tickets based on number of incidents;

evaluate problem ticket characteristics per configuration class to determine a coefficient of trouble value for each configuration class;

rank the configuration classes according to their coefficient of trouble, wherein a highest ranking has the least coefficient of trouble;

determine potentially optimal configurations based on the rankings; and provide to the customer recommendations for migration paths corresponding to the potentially optimal configurations; and at least one data store, comprising the configuration data, customer data, and problem data; and a network interface for a point of interconnection between the at least one computer system and the data store.

18. The system of claim 17 wherein the at least one computer system is further configured to: modify the customer's migration paths such that the modified migration paths make more use of the potentially optimal configurations, while avoiding less optimal configurations.

19. The system of claim 17 provided to the customer on a subscription basis.

20. The system of claim 17 further comprising a proxy server operatively coupled with the at least one computer system and the at least one data store.

* * * * *